UNITED STATES PATENT OFFICE.

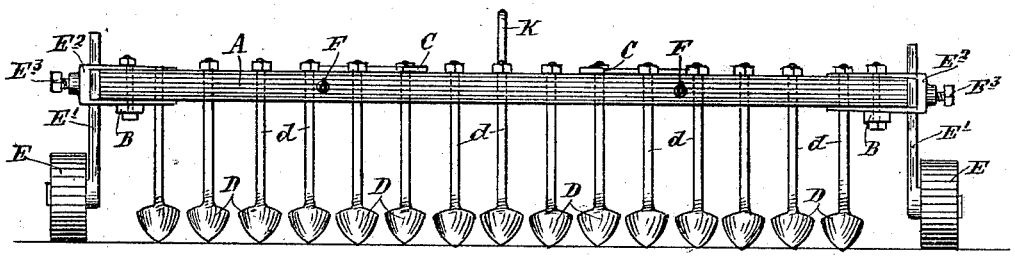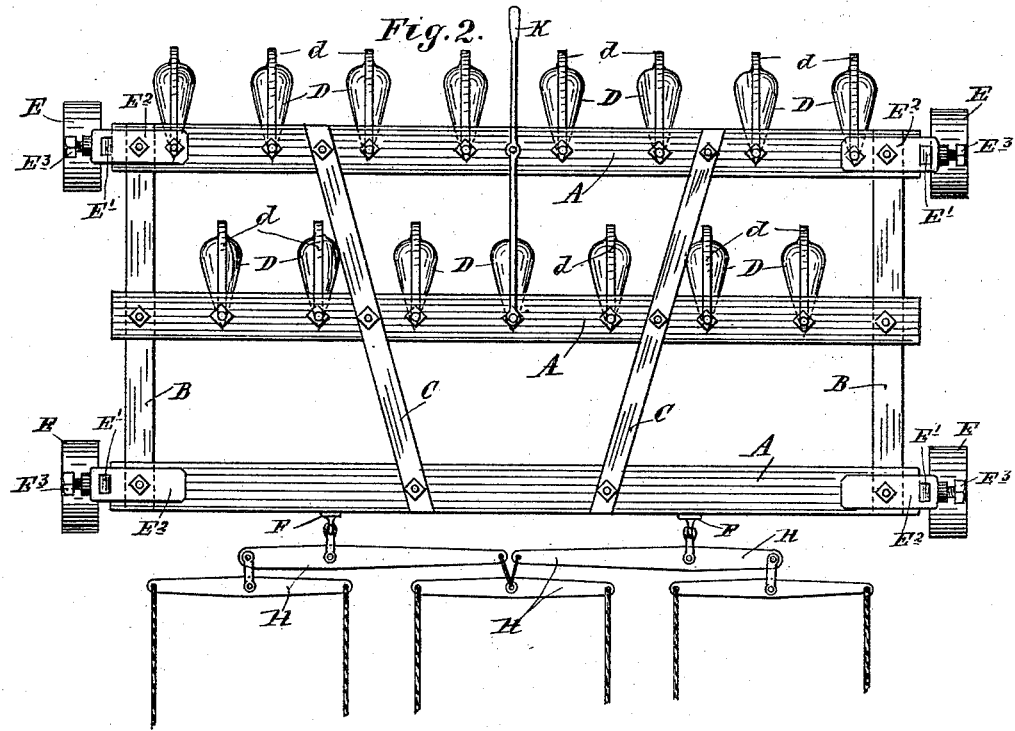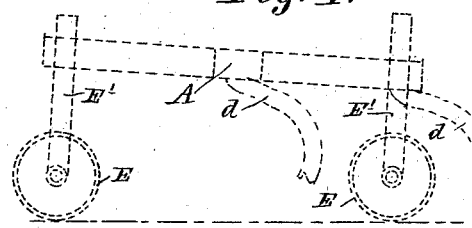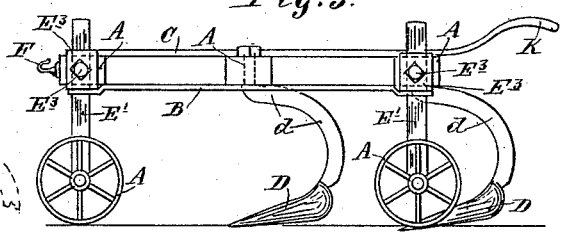

CHRISTOPHER AULSBER, OF MINNEAPOLIS, MINNESOTA.

CULTIVATOR.

SPECIFICATION forming part of Letters Patent No. 500,842, dated July 4, 1893.

Application filed December 19, 1892. Serial No. 455,565. (No model.)

*To all whom it may concern:*

Be it known that I, CHRISTOPHER AULSBER, a citizen of the United States, residing at Minneapolis, in the county of Hennepin and State of Minnesota, have invented certain new and useful Improvements in Cultivators; and I do hereby declare the following to be a full, clear, and exact description of the invention, such as will enable others skilled in the art to which it appertains to make and use the same.

My invention has for its object to provide an efficient cultivator, the shovels of which may be made to run at any desired depth, and on any desired angle or dip.

To this end, the invention consists of certain novel features of construction, which will be hereinafter fully described, and will be defined in the claims.

The accompanying drawings illustrate my invention, wherein, like letters referring to like parts, Figure 1 is a front elevation of the machine with the evener removed. Fig. 2 is a plan view of the machine. Fig. 3 is a side elevation (left side, with reference to the position, of the draft animals or line of travel) of the machine; and Fig. 4 is a diagram view similar to Fig. 3, with some parts broken away.

A, B, C, is a truss-work, constituting the frame of the machine, of which parts, A is a series of longitudinal bars, extending from one side to the other of the machine, B are end-bars bolted to the side bars A, and C are diagonal braces, arranged on top and bolted to the longitudinal or cross-bars A.

D are the cultivating shovels, formed integral with their sheths or shanks $d$, which are seated in and bolted to the rear pair of cross-bars. The sheths or shanks of the cultivating shovels, are of curvilinear form and of the desired shape, to give to the shovels the normal or most commonly desired dip, when the frame is in a horizontal position. Two series of shovels are thus secured to the frame and more might be added by the use of additional cross-bars A, if so desired. The machine may also be made of any desired width, by lengthening the frame and adding additional shovels in each series. The frame is supported by ground wheels E and spindle standards E', the vertical portions of which work through clevis-like keepers $E^2$, bolted to the corners of the frame, and are secured in whatever position the frame may be set by angular headed jam-bolts $E^3$, working through screw-threaded seats in the heads of the keepers. There are four of these ground-wheels, spindle standards and keepers located, one at each corner of the machine. This arrangement permits either a common vertical adjustment of the frame, to vary the depth, at which the shovels are to run, or an independent adjustment at either the forward or rear end of the frame, so as to vary the angle or dip of the shovels.

F are hooks or equivalent devices secured to the forward cross-bar A, for the application of the ordinary draft attachments, which are shown as in the form of a three-horse evener H.

The application and usage of the device are obvious. The frame is set on the spindle-standards, for the desired depth of cut, and the desired dip or angle of the shovels. The shape of the shovels is such, that at whatever depth or angle they may be set, they are bound to scour. The shape and set of the shovels are such, that the ground will be lifted and not dragged, thereby rendering the draft comparatively light, and leaving the ground in the most desirable condition. The support of the cultivator frame and shovels, in this way, from ground wheels, with freedom for vertical and angular adjustment, secures evenness of action on the ground, and comparative uniformity of draft for any given depth of cut on the draft animals.

When it is desired to move the machine, from one field to another, or over the road, the frame is simply adjusted on the supporting spindle and ground-wheels, so as to be of such a height that they will clear the ground.

The machine is of such simple construction, that it can be made at small cost. If any shovel should become worn or broken, they are readily replaced by others. If the cross-bars A are made of wood, they should be reinforced by rivet-bolts or otherwise against the strain from the shovels. They may, of course, be made of iron, but I have found that wooden-bars properly reinforced, are sufficiently strong and keep the frame lighter.

A handle K may be attached to the rear of the frame, for enabling the operator to lift or steer the machine, as desired.

What I claim, and desire to secure by Letters Patent of the United States, is as follows:

1. The cultivator truck having two ranks of shovels set in a substantially horizontal plane upon curved standards, each rank being set out of line with the path of the other, substantially as shown and described.

2. A rectangular cultivator frame having the main lateral bars A, the connecting bars B and the diagonal braces C, and provided at each corner with wheels E having vertical standards E' adjustable in keepers or brackets E², substantially as shown and described.

3. The cultivator frame as shown, provided at its corners with wheels having independent vertical adjustment, and having two ranks of shovels set in a substantially horizontal plane upon curved standards each rank being set out of line with the path of the other, substantially as shown and described.

In testimony whereof I affix my signature in presence of two witnesses.

CHRISTOPHER $\underset{\text{mark}}{\overset{\text{his}}{\times}}$ AULSBER.

Witnesses:
JAS. F. WILLIAMSON,
EMMA F. ELMORE.